(12) United States Patent
Epperlein et al.

(10) Patent No.: US 10,768,002 B2
(45) Date of Patent: Sep. 8, 2020

(54) ASSESSING PERSONALIZED RISK FOR A USER ON A JOURNEY

(71) Applicant: INTERNATIONAL BUSINESS MACHINES CORPORATION, Armonk, NY (US)

(72) Inventors: Jonathan Epperlein, Phibsborough (IE); Yassine Lassoued, Carpenterstown (IE); Martin Mevissen, Dublin (IE); Julien Monteil, Dublin (IE); Giovanni Russo, Dublin (IE); Robert Shorten, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

(21) Appl. No.: 15/794,321

(22) Filed: Oct. 26, 2017

(65) Prior Publication Data
US 2019/0128686 A1 May 2, 2019

(51) Int. Cl.
| | | |
|---|---|---|
| *G01C 21/34* | (2006.01) | |
| *G01C 21/36* | (2006.01) | |
| *G06Q 10/04* | (2012.01) | |
| *G06Q 10/06* | (2012.01) | |
| *G08G 1/0968* | (2006.01) | |
| *G06Q 50/00* | (2012.01) | |

(Continued)

(52) U.S. Cl.
CPC ..... *G01C 21/3461* (2013.01); *G01C 21/3492* (2013.01); *G01C 21/3641* (2013.01); *G01C 21/3697* (2013.01); *G06Q 10/04* (2013.01); *G06Q 10/0635* (2013.01); *G06Q 10/0639* (2013.01); *G06Q 50/00* (2013.01); *G06Q 50/14* (2013.01); *G08G 1/0141* (2013.01); *G08G 1/096827* (2013.01); *G01C 21/3469* (2013.01); *G01C 21/3484* (2013.01)

(58) Field of Classification Search
CPC ............ G01C 21/3461; G01C 21/3492; G01C 21/3641; G01C 21/3469; G01C 21/3484; G01C 21/3697; G06Q 50/14; G06Q 10/0639; G06Q 10/0635; G06Q 10/04; G06Q 50/00; G08G 1/00; G08G 1/096827; G08G 1/0141
See application file for complete search history.

(56) References Cited

U.S. PATENT DOCUMENTS

| | | |
|---|---|---|
| 8,022,831 B1 * | 9/2011 | Wood-Eyre ............... B60T 7/14 180/272 |
| 9,574,888 B1 | 2/2017 | Hu et al. |
| 2010/0332131 A1 | 12/2010 | Horvitz et al. |

(Continued)

FOREIGN PATENT DOCUMENTS

WO   2016135561 A1   9/2016

*Primary Examiner* — Nga X Nguyen
(74) *Attorney, Agent, or Firm* — Griffiths & Seaton PLLC

(57) ABSTRACT

A system and method for learning and predicting personalized risk associated with a journey for a user are presented. Contextual data may be gathered and analyzed from a plurality of data sources relating to a journey of a user. A risk associated with the journey may be learned for the user according to the contextual data. One or more risk models may be generated according to the learned risks. One or more potential risks associated with a subsequent journey may be predicted using the one or more risk models.

17 Claims, 7 Drawing Sheets

(51) Int. Cl.
*G08G 1/01* (2006.01)
*G06Q 50/14* (2012.01)

(56) References Cited

U.S. PATENT DOCUMENTS

2014/0222330 A1  8/2014  Kohlenberg et al.
2018/0075747 A1* 3/2018  Pahwa ................ B60W 40/10

* cited by examiner

ASSESSING PERSONALIZED RISK FOR A USER ON A JOURNEY

BACKGROUND OF THE INVENTION

Field of the Invention

The present invention relates in general to computing systems, and more particularly to, various embodiments assessing personalized risk to a user on a journey by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency and safety such as, for example, for using the vast amount of available data to recognize and mitigate personalized risks of a user in the time-critical context of an ongoing journey.

SUMMARY OF THE INVENTION

Various embodiments for predicting personalized risk associated with a journey for a user using one or more processors, are provided. In one embodiment, by way of example only, a method for predicting personalized risk associated with a journey for a user, again by a processor, is provided. Contextual data may be gathered and analyzed from a plurality of data sources relating to a journey of a user. A risk associated with the journey may be learned for the user according to the contextual data. One or more risk models may be generated according to the learned risks. One or more potential risks associated with a subsequent journey may be predicted using the one or more risk models.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
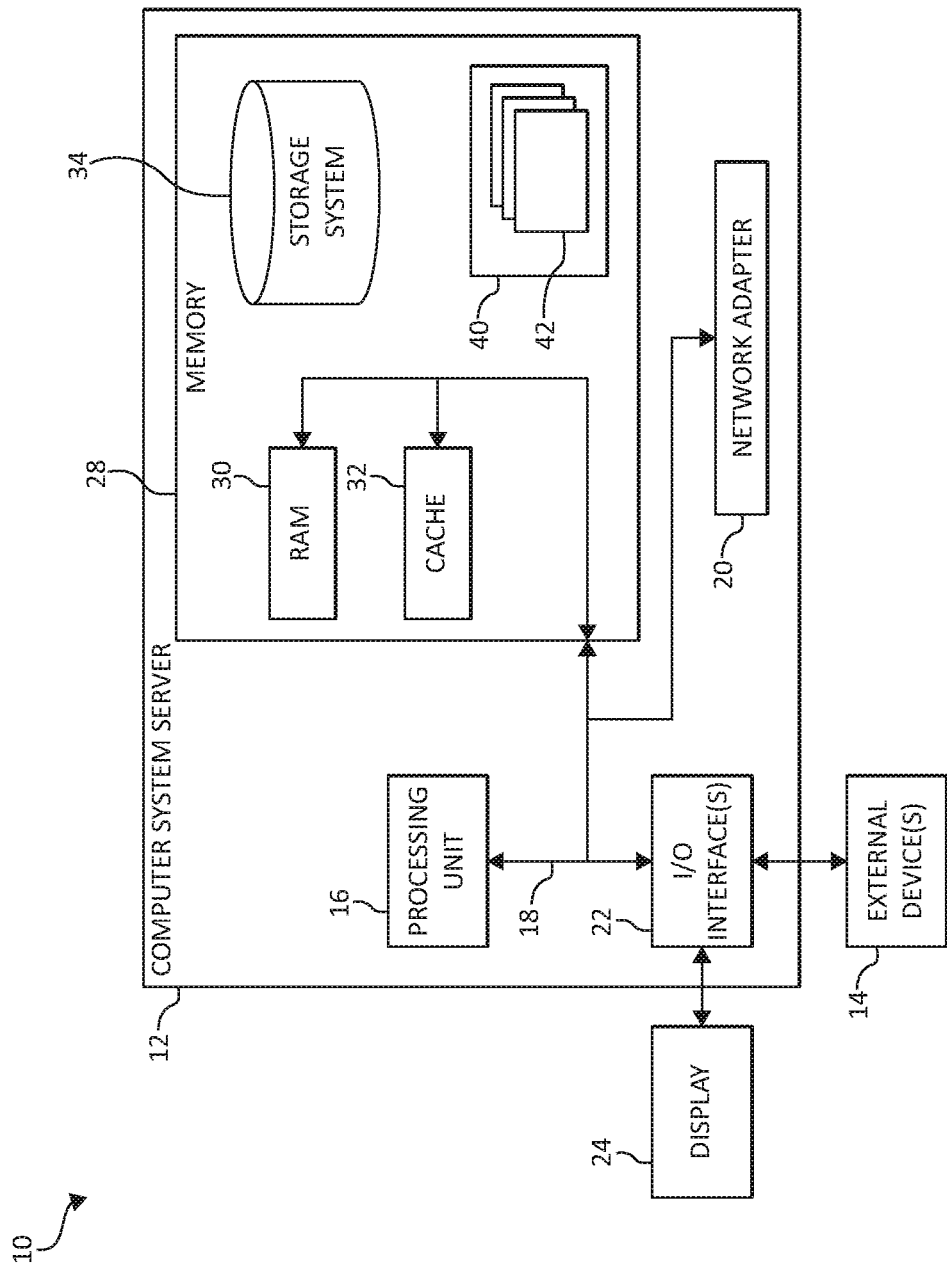
FIG. 1 is a block diagram depicting an exemplary computing node according to an embodiment of the present invention.

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems in a variety of settings, particularly within the cloud computing environment, provide various beneficial uses to a user. Various IoT appliances may be used for personal use, such as travel or exercise, while also using the IoT appliances within various types of vehicles or navigation systems for travel. For example, an IoT device may be used to inform a user or vehicle of any incidents which may affect travel time/travel safety/travel comfort on a journey and/or be used to assist with travel planning. Such information may be provided to a user during navigation along a route via an in-car navigation device, such as a personal navigation device (PND) or integrated device, or may be provided as an input to an Advanced Driver Assistance System (ADAS).

Moreover, a traveler on a journey may encounter a risk. While some risks are obvious or trivial (e.g., road closures, traffic jams, damage to a vehicle), some non-obvious risks may not appear as risks, yet in fact are complex risks that may only arise as a combination of conditions (e.g., reliance of the vehicle on a charging station which is not available at the predicted destination). Thus, a need exists for assessing a risk associated with user journeys, extracting the a priori available conditions causing the risk, and generating risk models to predict potential risks in future journeys. In this way, generated risk models (e.g., predictive models) may be provided to a variety of computing systems. Aspects of the present invention provide a solution to incrementally learn risk models by monitoring the journey and the user behavior in the context of internal and external conditions, and upon detecting anomalies or unusual behaviors, the conditions that may have led to this are identified, and an incremental risk model is updated. In this way, the present invention may detect a risk and further be used to determine mitigating actions in one or more types of computing applications such as, for example, in mobility applications. A risk model may be learned for detecting each risk (e.g., a set of formal conditions, checkable by a computer, that define a risk). Simply stated, the mechanisms of the present invention generate predictive models to enable other systems (e.g., a cognitive in-car companion) that may use these so as to react to and/or compute mitigating actions.

In one aspect, contextual data may be gathered and analyzed from a plurality of data sources relating to a journey of a user. A risk associated with the journey may be learned for the user according to the contextual data. One or more risk models may be generated according to the learned risks. One or more potential risks associated with a subsequent journey may be predicted using the one or more risk models.

In an additional aspect, the present invention provides for learning and predicting personalized risk associated with a journey for a user. One or more risk models may be generated according to analyzed contextual data gathered from a plurality of data sources relating to a journey of a user, behavior of the user, risks associated with one or more alternative users of the journey (e.g., collaborative users sharing data, risks, and/or risk models associated with the journey), or a combination thereof. One or more potential risks associated with a subsequent and/or future journey may be predicted using the one or more risk models.

As defined herein, a risk may be a combination of events and/or conditions, internal or external to a user or vehicle that has the potential to negatively impact the safety, convenience, or duration of a journey. Risk assessment may refer to the identification of risk events, conditions, the quantification or qualification of a risk's potential impact on the journey and the confidence therein. Risk mitigation may be an action taken to avoid a given risk. A user may be a person, operator or passenger of a vehicle, or a traveler on the journey. That is, one or more risk models may be learned by assessing risk associated with a completed journey. The cause and/or conditions of each risk may be learned, identified, and extracted. One or more risk models may be generated to predict potential risk for a subsequent or future journey.

In an additional aspect, various embodiments provide for learning and building risk models in mobility applications for assessing risk associated with user journeys. The present invention may extract the available conditions causing the risk, and generate formal models to predict potential risk in future journeys.

In an additional aspect, the present invention learns one or more mobility risk models based on 1) analysis of the current trip/journey and user (e.g., driver, traveler, etc.), 2) user behavior, 3) monitored contextual data related to the current journey, both from external sources (e.g., weather, traffic, events, etc.) and internal sources (e.g., on-board system, user calendar, etc.), 4) shared risk experiences amongst multiple users (e.g., collaborative user data), and 5) predicted risk based on the learned risk models.

Moreover, the present invention provides a solution that continuously monitors the journey and the user (e.g., driver) behavior in view of external conditions (e.g., events, traffic data, weather data, etc.). In one aspect, the present invention does not know a priori which conditions constitute risk. Accordingly, an anomaly or unusual behavior may be detected in the journey (e.g., delay, U-turn, suboptimal route, problem, detour, etc.). The detected anomaly may be considered as risk. A log of data and events received during the journey or prior to the journey may be checked and inspected. Risk conditions may be identified by matching the observed anomaly with the events that may have caused the anomaly such as, for example, by using machine learning operations or a rule-based operation (e.g., geospatial proximity, relevance measure, etc.). Feedback and explanations from the user may be collected and used to increase the matching capabilities or to identify the events that caused the anomaly. Mechanisms of the illustrated embodiment may then, knowing the causes of the anomaly or unusual behavior and their impact (e.g., long delay, etc.), update one or more risk models including the cause (e.g., the risk conditions) and the impact on the user such as, for example, duration of the journey.

The various embodiments may be executed in a cloud computing environment and may be connected to the on-board systems of one or more cars that may be collaborative for sharing data between each of the on-board vehicle computing systems. The various embodiments may have access to external and internal data, including current and historical weather data, driver's historical routes, and driver's calendars.

Also, as used herein, a vehicle may be an automobile, bicycle, hovercraft, scooter, bus, motorcycle, boat, ship, aircraft, plane, helicopter, drone, off road vehicle, truck, tractor, and/or other device used for movement or transportation. Also, sensors may include proximity sensors, cameras, radio frequency identification "RFID" readers, biometric sensors, wearable sensors, computers, handheld devices (e.g., Global Positioning System "GPS" device or step counters), smartphones, and/or other sensor based devices.

The so-called "journey" may be very subjective and context dependent. A journey may simply be, in a broadest possible meaning, the entire/whole travel experience from a point A to a point B such as, for example, a trip (e.g., a trip from a person's home to a place of work). For example, a journey may encompass an entire travel experience.

In a more limiting context, a journey may include one or more actions or movements of traveling from one location to another location. The journey may also include one or more acts, events, decisions, or travel related operations relating to one or more acts of moving from one location to one or more alternative locations. A journey may include each decision, experience, action, and/or movement within and without a vehicle. A journey may include one or more routes and destinations. A journey may also include one or more actions, movements, stops (temporary or permanent), travel information, reservations, transportation options, modes of travel, and/or one or more operations relating to navigation systems, entertainment systems, and/or telecommunication systems. In one aspect, a journey may be a user defined location-to-location (point-to-point) journey, associated events of a trip, and/or a single or multi-modal travel plan. Also, the journey may be location-to-location (point-to-point) journey, and/or a single or multi-modal travel plan.

In one aspect, a database may include, but is not limited to, the knowledge domain or data repository of a collection of material, information, content and/or other resources related to a particular subject or subjects. For example, the database may include historical data relating to a user and/or vehicle, a user profile (e.g., calendar information, historical data relating to previous routes/destination data of the user, emotional/physical/mental condition of the user, preferences, priorities, biomedical data, psychophysical parameters of the user, medical history, emotional data, a drivers skills set, and the like), environmental data, traffic data, routes, roads, streets, highways, interstates, trails, bridges, maps, airports, and/or a variety of infrastructures relating to travel each having information relating to both size, length, a degree of complexity or difficulty of travel (e.g., travel navigation complexity), visibility, problems or issues relating to road work or repair, and/or traffic congestion.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
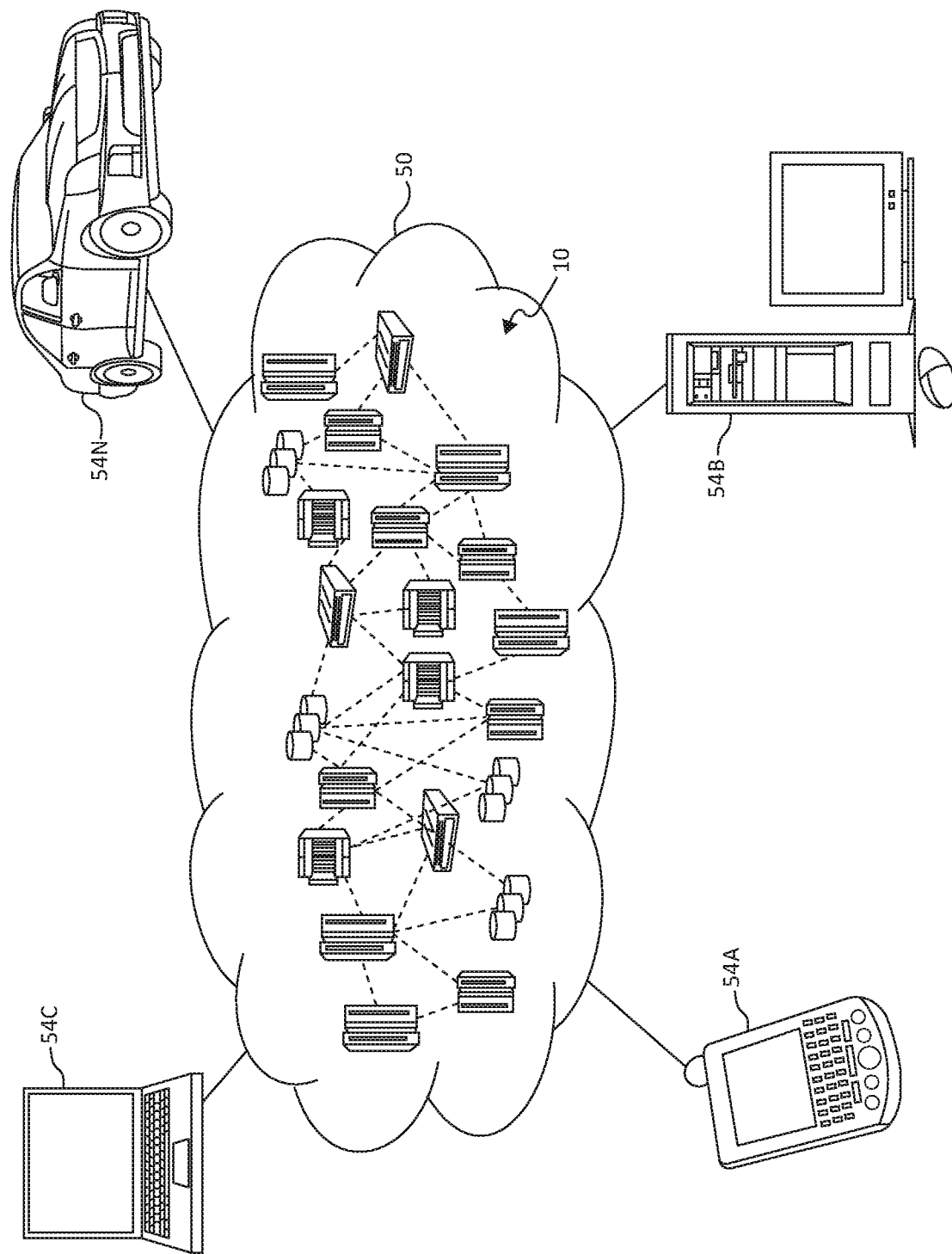
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
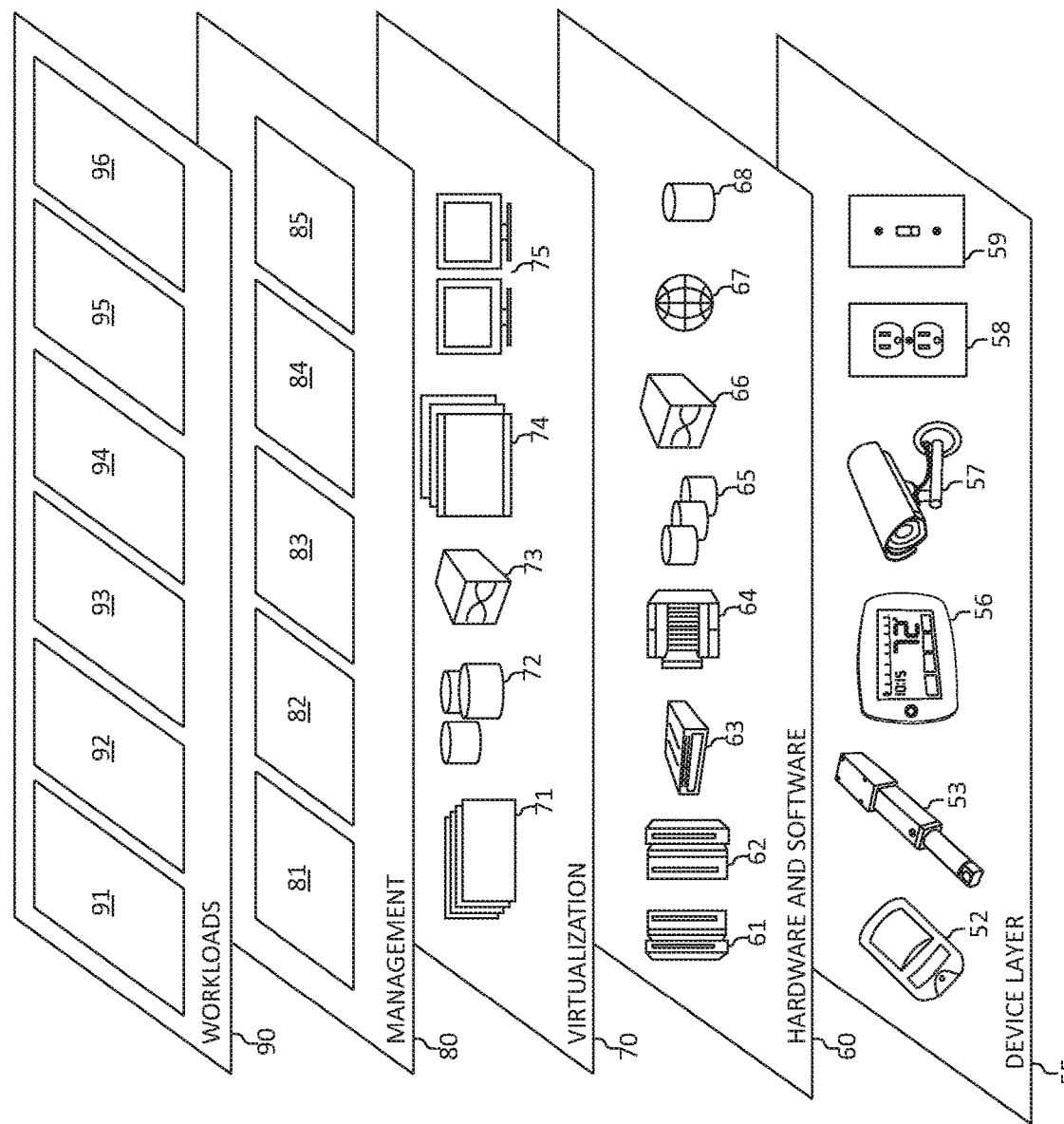
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various personalized risk prediction workloads and functions 96. In addition, personalized risk prediction workloads and functions 96 may include such operations as data analytics, data analysis, and as will be further described, notification functionality. One of ordinary skill in the art will appreciate that the personalized risk prediction workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Thus, as previously indicated, the various aspects of the present invention generate one or more risk models, learn one or more risks, and predict one or more risks (e.g., potential/future risks) at a next journey based on the generated risk models and/or learned risks.

Consider the following example of an implementation of the aforementioned functionality where the personalized risk prediction system may be used. In one embodiment, risk occurrences may be detected by the proposed system in two ways: 1) by anomaly detection (e.g., a user changed route from his/her usual routes to avoid a road segment), and/or 2) by user-provided feedback (e.g., the user answers questions about his/her journey and/or interacts with an interactive computing system such as, for example, an in-car system to let the interactive computing system know that the interactive computing system failed to inform him/her of a risk or of the conditions leading to a risk).

For example, assume a particular road segment "X" tends to become flooded after it rains following a long dry period such as, for example, due to the dried-out soil unable to absorb the water. Drivers that typically use road segment "X" (as evidenced by each driver's driving history and next destination) may reach road segment "X" but then have to find a detour due to the flood. When several drivers exhibit this detour-behavior, aspects of the illustrated embodiments may detect the deviation (e.g., rerouting away from road segment "X") from the normal journey of traveling on road segment "X" as an anomaly and label the set of detour-behavior conditions as "risk." The conditions common to this particular occurrence of risk may be identified as "detected risk: drivers trying to use road segment "X" in a normal vehicle journey during rain after dry days" and commits, for example, the following Boolean expression to the risk models: "road segment: X" AND "weather current: rain" AND "weather past: dry" AND NOT "vehicle-type: all-terrain." Thus, one or more risk models and risk conditions may be learned and labelled such as, for example, using anomaly detection.

As an additional example, assume at a driver's destination (e.g., a university college campus), the internal gates to the college campus are closed during peak hours (e.g., 7:00 a.m. to 9:00 a.m.), making sections of the campus inaccessible from certain gates. This information is not published through any application programming interface ("API") and hence automated systems may not have access to it. Assuming, even if this information is published, the fact of the internal gates being close may constitute a risk to the driver that may be unknown in advance. Thus, assume the driver is early (and hence traveling during peak hours) on a selected day. Assume now, that the driver arrives at the closed, internal gates and stops in front of the gates. At this point, the driver realizes that he/she now must take a detour. If the driver takes a detour, then the mechanisms of the illustrated embodiments may detect the detour-behavior as an unusual behavior or anomaly and ask the driver about the reason for it. Alternatively, the driver may simply explain to the system what just happened. Either way, the system gets the risk explanation from the driver through natural language conversation. The mechanisms of the illustrated embodiments commit the following new risk condition, for example, to a risk model: "route: X" AND "time greater than: 7 am" AND "time less than: 9 am" AND "destination: Y." Thus, one or more risk models and risk conditions may be learned and labelled such as, for example, by using user-interaction.

Figure 4:
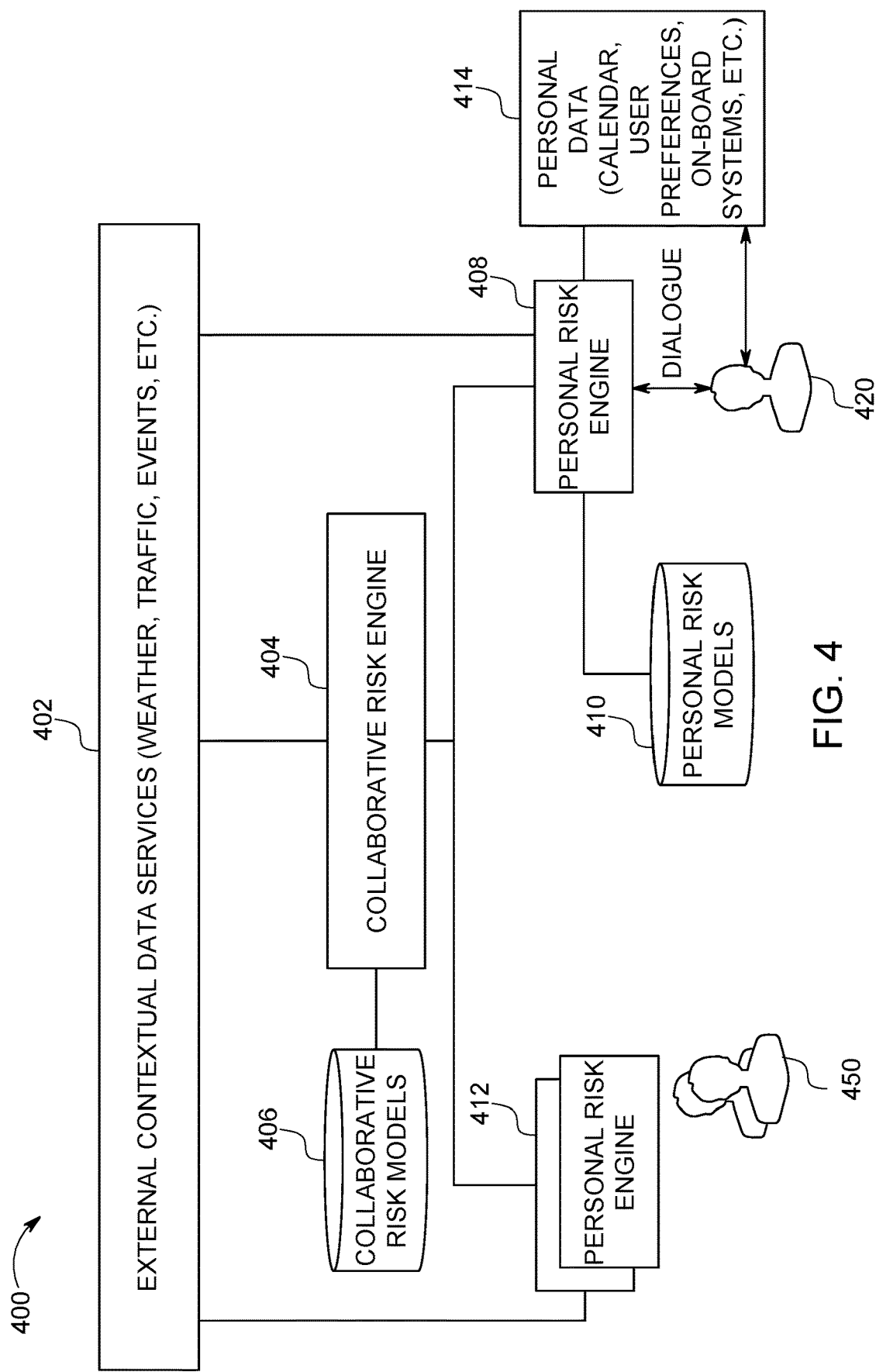
FIG. 4 is an additional block diagram depicting an exemplary personalized risk prediction system in accordance with aspects of the present invention.

Turning now to FIG. 4, a block diagram depicting an exemplary personalized risk prediction system. It should be noted that the personalized risk prediction system may be included in and/or associated with computer system/server 12 of FIG. 1, incorporating one or more processing unit(s) 16 to perform various computational, data processing and other functionality in accordance with various aspects of the present invention.

As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a personalized risk prediction system in accordance with the present invention. Many of the functional blocks 400 may execute as background processes on various components, either in distributed computing components, or on the user device, or elsewhere, and generally unaware to the user performing generalized tasks.

A collaborative risk engine 404 may collect contextual data such as, for example, via external contextual data services 402. The collaborative risk engine 404 may analyze one or more risk models from different users via the collaborative risk models database 406. The collaborative risk models database 406 enables one or more users to share risk experiences (as appropriate or as selected) amongst users sharing similar user behavior. The collaborative risk engine 404 may be in communication with one or more personal risk engines such as, for example, personal risk engines 408 and 412, each of which may be executed or used in a cloud computing environment. The personal risk engines 408 and 412 may engage one or more users such as, for example, user 420 and/or users 450. The personal risk engines 408 and 412 may collect data from the user 420 and/or users 450. The collected personal data 414 may include, but is not limited to, user calendar data, user preference data, and/or on-board systems, and the like. One or more personal risk engine models such as, for example, personal risk engines 408 and 412 may learn and build one or more risk models 410 (e.g., personal risk models 410) using collected feedback ("dialogue") and/or the collected personal data.

Figure 5:
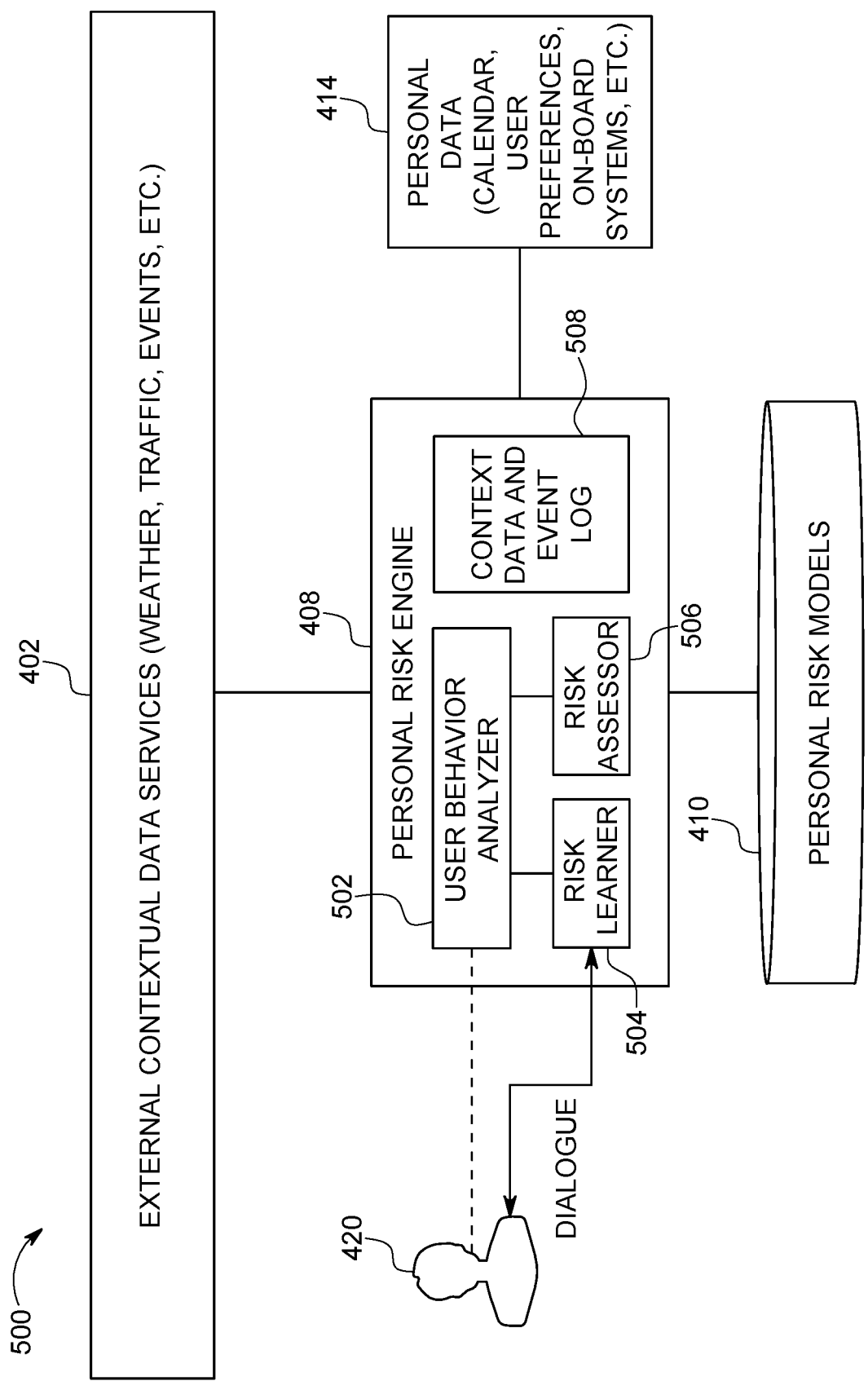
FIG. 5 is an additional block diagram depicting an exemplary learning phase using a personalized risk prediction system in accordance with aspects of the present invention.

Turning now to FIG. 5, a block diagram of exemplary functionality 500 relating to the personalized risk engine in the personalized risk prediction system of FIG. 4 is depicted. It should be noted that the personalized risk prediction system may be included in and/or associated with FIG. 4 and the computer system/server 12 of FIG. 1, incorporating one or more processing unit(s) 16 to perform various computational, data processing and other functionality in accordance with various aspects of the present invention.

A personal risk engine such as, for example, personal risk engine 408 and/or 412 (which is illustrated in FIG. 5 as personal risk engine 408, but may also apply to personal risk engine 412), may include a user behavior analyzer 502, a risk learner 504, a risk assessor 506, and a context data and event log database 508. The personal risk engine 408 may observe a journey of a user and user behavior so as to identify and detect one or more anomalies (e.g., "unusual" or non-standardized behavior). The risk models 410 (e.g., personal risk models 410) may represent the association between risk factors and risk impacts such as, for example, a set of rules or one or more sophisticated interactions (e.g., Bayesian network of risk factors and impacts). A risk factor may be defined as an event (e.g., a soccer match, adverse weather condition, etc.) and the context of the event (e.g., a time of the day, location, etc.). An impact upon the user may include an impacted location(s) such as, for example, a destination, a point of interest, a road intersection, and the like. The impact may also include the impact's potential associated cost (e.g., severity of the delays) and a confidence value (e.g., frequency of the observed impact, probability of a risk occurring, etc.).

The risk learner 504 may learn one or more risks from user behavior (e.g., behavior of user 420), external contextual data, and/or personal data. The risk learner 504 may update one or more risk models (see risk models 410 of FIG. 4). The risk learner 504 builds and updates the dependencies between risk factors and impacts.

The risk assessor 506 may assess risk related to the current journey from the learned risk model given the context and events and user data (predicted or provided behavior of the user 420). The assessment by the risk assessor 506 may include, for example, a naïve Bayes or a hidden Markov model to compute the probability of risk and impacts of the risk. The user 420 may be notified of the risk when the risk exceeds a given threshold (e.g., which may be based on extreme value theory, value at risk, etc.).

Figure 6:
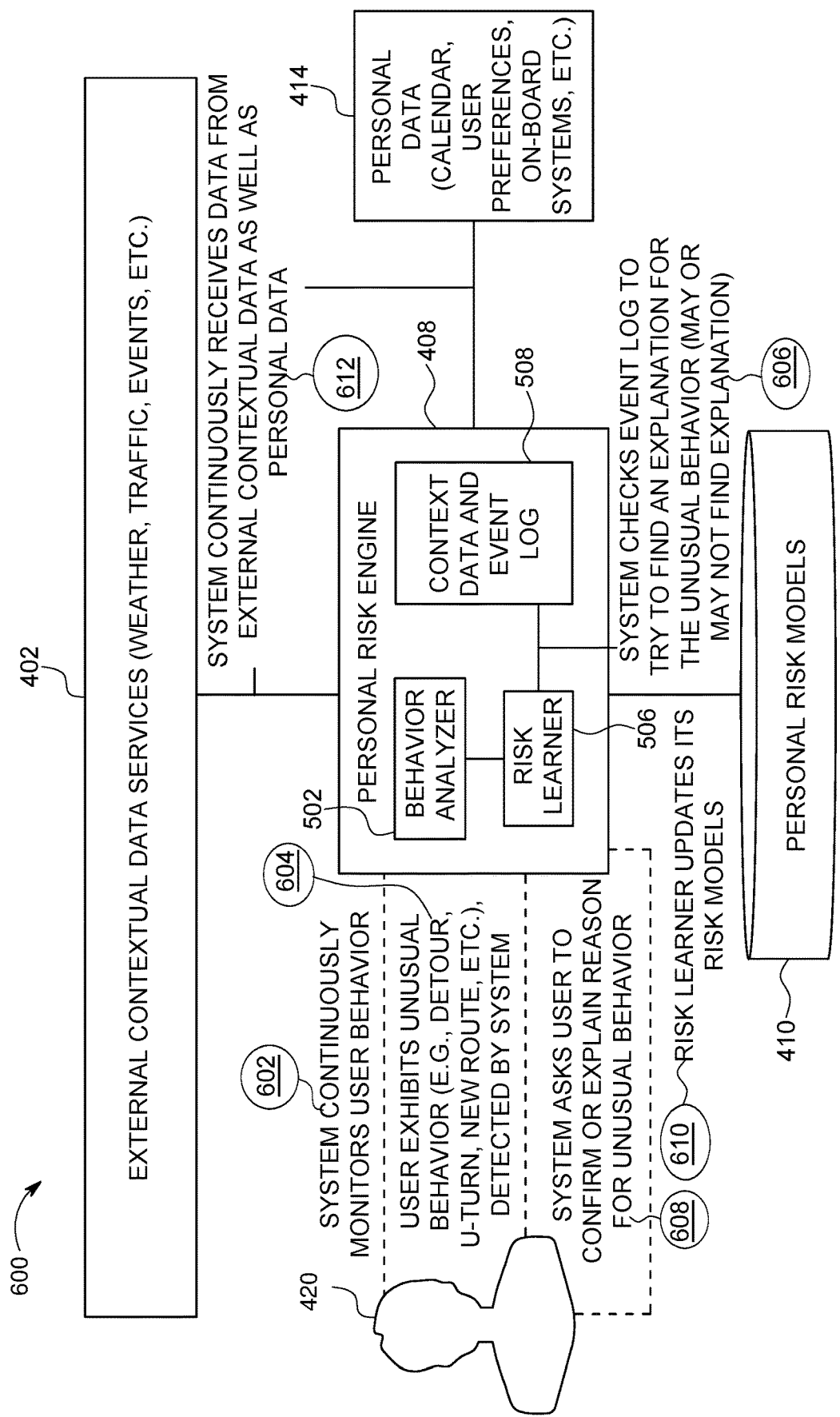
FIG. 6 is an additional block diagram depicting an exemplary personalized risk prediction system using a personal risk engine in accordance with aspects of the present invention.

Turning now to FIG. 6, a block diagram of exemplary functionality 600 relating to a prediction phase of the personalized risk prediction system of FIG. 4 is depicted. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" of functionality, in the same descriptive sense as has been previously described in FIGS. 1-5. With the foregoing in mind, the module blocks 600 may also be incorporated into various hardware and software components of a system for image enhancement in accordance with the present invention. Many of the functional blocks 600 may execute as background processes on various components, either in distributed computing components, or on the user device, or elsewhere, and generally unaware to the user performing generalized tasks.

Starting now in block 602, the personal risk engine 408 may continuously monitor user behavior of a user 420 and may continuously receive data from external contextual data 612. The personal risk engine 408 may detect unusual behavior (e.g., an anomaly in behavior based on a standardized or "normal" behavior pattern learned from previous user behavior), as in block 604. For example, the anomaly may be taking a detour, U-turn, selecting a new route, or any other detected user behavior inconsistent with learned user behavior for a particular course of action or journey. The personal risk engine 408 may check the context data and event log 508 to identify one or more reasons/justifications for unusual behavior, as in block 606. The personal risk engine 408 may ask the user to confirm or explain the reason for the detected unusual behavior (e.g., an anomaly in behavior), as in block 608. That is, the personal risk engine 408 may cognitively reason and interact with the user 420. The personal risk engine 408 may learn or update one or more risk models 410 (e.g., personal risk models 410), as in block 610.

Thus, FIG. 6 illustrates the prediction phase of the personalized risk prediction system of FIG. 4. The prediction phase may assume the personalized risk prediction system knows in advance a user's intention (e.g., route, destination, etc.). This foreknowledge may be provided by the user (e.g., explicitly or through a user calendar, etc.) or by an external user intention prediction system based on historical data. The personalized risk prediction system continuously monitors data received from external and internal sources (e.g., weather, traffic, events, vehicle data, etc.) and matches them with patterns learned from historical risk events (risk models). If the personalized risk prediction system finds any risk, the user may be alerted to the risk. User feedback may be taken into consideration and fed back into the learned models. Machine learning algorithms may also be employed in the prediction phase to learn the user behavior, build or learn models, and/or collect feedback.

In one aspect, the personalized risk prediction system may employ one or more risk models automatically learned and generated. The personalized risk prediction system may combine both a user's intention prediction and risk assessment for a particular context such as, for example, the context of a journey. The personalized risk prediction system may employ both navigation risk, such as traffic, accidents, etc., while also considering any type of risk based on received driver data, car data, and/or collaborative data from a collection of users (e.g., vehicle collaboration data from multiple drivers). The personalized risk prediction system may also use the permanent flux of in-car data from multiple sources as well as historical data of the in-car data. This collection of data may be used to identify and match patterns to one or more risks based on the intentions of the user. The personalized risk prediction system may rely on both centralized and distributed databases for driver intention and risk assessment prediction. The personalized risk prediction system may also reason with the user for drivers' inputs if the personalized risk prediction system fails to make the correct association between driver intention and risk assessment, relying on anomaly detection.

Figure 7:
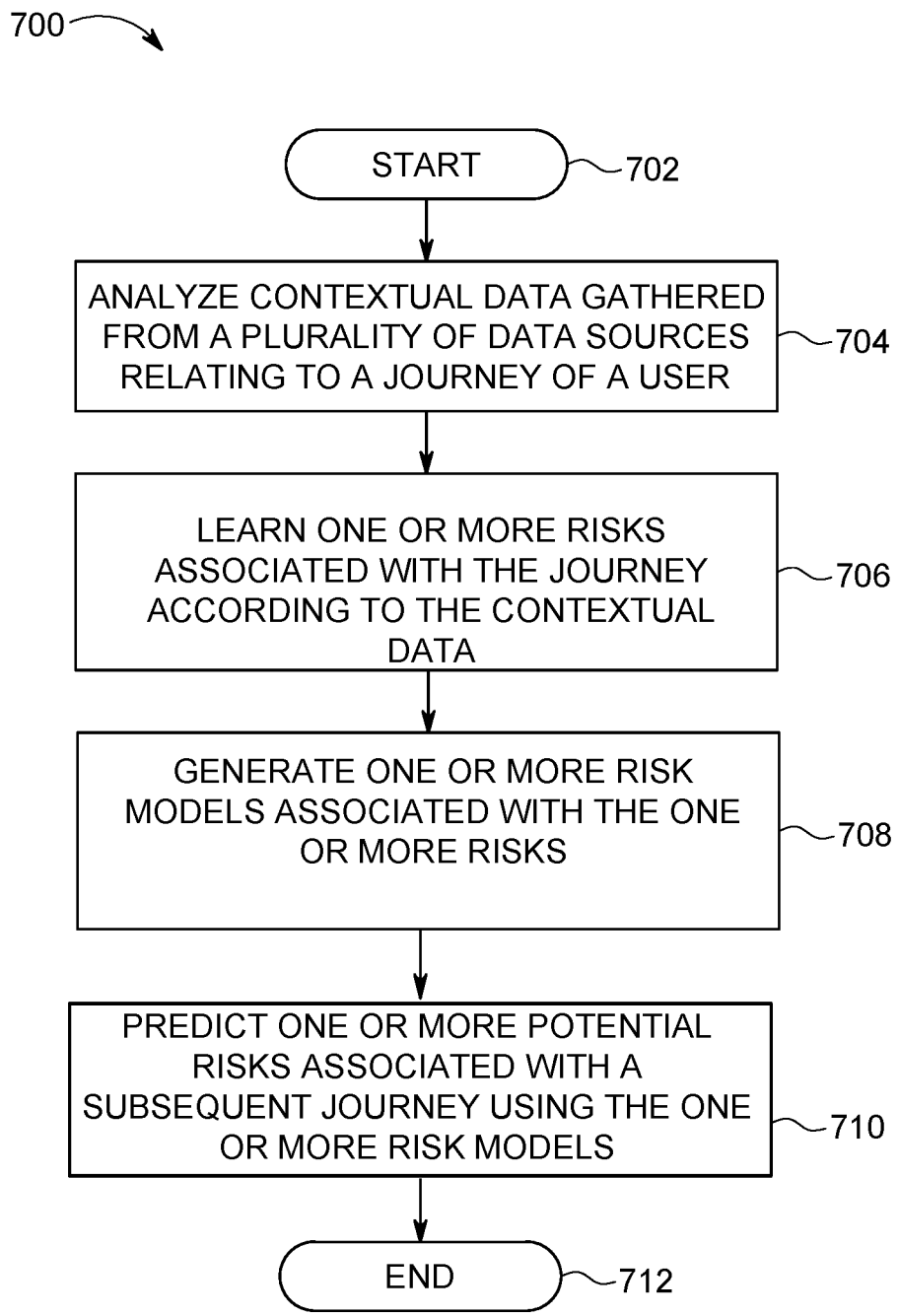
FIG. 7 is an additional flowchart diagram depicting an additional exemplary method for predicting personalized risk associated with a journey for a user by a processor, again in which aspects of the present invention may be realized.

Turning now to FIG. 7, a method 700 for learning and predicting personalized risk associated with a journey for a user by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. Contextual data may be gathered and analyzed from a plurality of data sources relating to a journey of a user, as in block 704. One or more risks associated with the journey may be learned (and/or generated) for the user according to the contextual data, as in block 706. One or more risk models may be generated according to the learned one or more risks, as in block 708. One or more potential risks associated with a subsequent journey may be predicted according to the one or more risk models, as in block 710. The functionality 700 may end, as in block 712.

In one aspect, in conjunction with and/or as part of at least one block of FIG. 7, the operations of method 700 may include each of the following. The operations of method 700 may monitor the journey and the user according to the contextual data. The operations of method 700 may collect feedback information from the user for determining the risk associated with the journey, and/or collect the feedback information by cognitively reasoning and interacting with a user via a cognitive component. An anomaly may be detected in behavior of the user on the journey. The anomaly may be detected by comparing current behavior of the user with previously observed behavior of the user on the journey to detect the anomaly; comparing current behavior of the user with behavior of one or more alternative users on the journey to detect the anomaly; and/or comparing current behavior of the user with defined, standardized behavior.

The operations of method 700 may match an observed anomaly with one or more causes of the observed anomaly from a list of previously received information relevant to the journey. The operations of method 700 may monitor the contextual data and each event associated with the journey and detect the risk associated with the journey for the user according to the contextual data, identified events, and one or more risk models. The operations of method 700 may detect the risk, the one or more potential risks, or combination thereof associated with the journey or subsequent journey for the user according to the contextual data, identified events, and one or more risk models. The operations of method 700 may learn the one or more risk models from a plurality of collaborative users.

A machine learning mechanism may be initialized to learn behavior of the user on the journey and one or more risk models. The plurality of data sources may include at least a user profile, sensor based devices associated with the user or vehicle, wearable sensors, camera devices, various data sources within governmental entities, commercial entities, Internet of Things (IoT) devices within an IoT computing network, or a combination thereof.

The contextual data may include at least historical data relating to a user or vehicle, user behavior, learned behavioral data, one or more selected priorities of the user, actions of the user, calendar information associated with the user, information provided by one or more sensor devices or tags, a health state of the operator, biometric data of the user, biometric information surveyed from an occupant of a vehicle or an alternative vehicle, physiological data, feedback information, social media information, weather, traffic conditions, environmental conditions, alerts, route conditions, events, accidents, news information, emergency data information, data obtained in real time from sensor based devices associated with the vehicle, detected vehicular faults or failures, devices or components of a vehicle being in an on position or off position, data relating to the vehicle, a plurality of vehicle factors, manufacturing information of the vehicle, a current position of the user or the vehicle, or a combination thereof.

In summary, the present invention provides for analyzing and observing user behavior for a journey so as to detect unusual behavior and anomalies. The detection of unusual behavior or anomalies may use machine learning, statistical operations, or a combination thereof. Context data and event logs may be maintained to track the contextual data and events during and around the current user journey. The present invention provides for matching unusual behavior or anomalies (and/or explanations provided by the user) with the logged data and events so as to identify a potential source of the unusual behavior or anomaly (e.g., the risk). A risk model may generate or add to (e.g., "enriches") a personalized risk model from: 1) the observed anomalies or unusual behavior, 2) the risk (e.g., the conditions or events at the origin of the anomaly or unusual behavior, which are provided by the context data, event log, and/or from user input or feedback), and/or 3) a detected or observed impact of the risk on the journey, which may be qualitative or quantitative (e.g., an estimated delay that impacts the user caused by the risk). One or more potential risks associated with the current journey may be detected based on the previously learned risk models and on the contextual and user data and events.

The risk models may be personalized by distinguishing between personal data and general data (e.g., overall identified, learned, or collected data). The risk models may be generated by collecting data from multiple users such as, for example, using a collaborative risk system that pools or shares learned risk models amongst users sharing similar behaviors (e.g., routes, destinations, intentions, etc.). Each risk may be periodically or randomly re-assessed to either be updated or eliminated (if the risk is determined to be invalid). Each of the risk models may be shared between the multiple users based on the similarities of behavior of the users and/or based on the genericity of the observed risks (e.g., common risks observed from the multiple users).

Accordingly, the present invention provides for cognitively learning identified risks from user behavior. One or more risk models may be generated from the learned risks. The risk models may be shared amongst multiple users. User input may be collected and received such as, for example, by interacting with the user, to collect feedback or in the event a prediction operation fails. A user profile may be created and maintained for each user. The user profile and/or aggregated user profiles may be used to associate risks linked to a driver(s) intention according to the particular context of a journey.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for learning and predicting personalized risk associated with a journey for a user by a processor, comprising:
analyzing contextual data gathered from a plurality of data sources relating to a journey of a user;
learning one or more risks associated with the journey according to the contextual data;
generating one or more risk models associated with the one or more risks; wherein generating the one or more risk models includes detecting an anomaly including a deviation between an expected route and an actual route taken by the user, and collecting feedback information from the user regarding the anomaly for determining the one or more risks and a cause of the one or more risks, the feedback information collected by cognitively interacting with the user via a cognitive component such that the user explains the feedback information, including a reasoning for the anomaly, to the cognitive component using natural language dialog; and
predicting one or more potential risks associated with a subsequent journey using the one or more risk models; wherein the one or more potential risks are automatically presented to the user via a computing device associated with the processor.

2. The method of claim 1, further including monitoring the journey, the user, one or more alternative users associated with the journey, or combination thereof to collect the contextual data, wherein the contextual data includes traffic data, weather data, road conditions, behavior of the user, a health state of the operator, biometric data of the user, sensor data, learned behavioral data of the user in relation to the journey, learned behavioral data of the one or more alternative users, risks shared from the one or more alternative users, or a combination thereof.

3. The method of claim 1, wherein the detecting of the anomaly includes:
comparing current behavior of the user with previously observed behavior of the user on the journey to detect the anomaly;
comparing current behavior of the user with behavior of one or more alternative users on the journey to detect the anomaly; or
comparing the current behavior of the user with defined, standardized behavior.

4. The method of claim 1, further including matching the anomaly with one or more causes of the anomaly from a list of previously received information relevant to the journey.

5. The method of claim 1, further including learning the one or more risks or the one or more risk models from the user, a plurality of collaborative users on the journey, a machine learning operation, or a combination thereof.

6. The method of claim 1, further including initializing a machine learning mechanism to learn behavior of the user on the journey and the one or more risk models, wherein the plurality of data sources includes at least sensor based devices associated with the user or vehicle, wearable sensors, camera devices, data sources relating to Internet of Things (IoT) computing networks, governmental entities, commercial entities, or combination thereof.

7. The method of claim 1, further including:
monitoring the contextual data and each event associated with the journey; and
detecting the one or more risks associated with the journey, the one or more potential risks associated with the subsequent journey, or combination thereof according to the contextual data, one or more identified events, one or more risk models, or combination thereof.

8. A system for learning and predicting personalized risk associated with a journey for a user, comprising:
one or more computers with executable instructions that when executed cause the system to:
analyze contextual data gathered from a plurality of data sources relating to a journey of a user;
learn one or more risks associated with the journey according to the contextual data;
generate one or more risk models associated with the one or more risks; wherein generating the one or more risk models includes detecting an anomaly including a deviation between an expected route and an actual route taken by the user, and collecting feedback information from the user regarding the anomaly for determining the one or more risks and a cause of the one or more risks, the feedback information collected by cognitively interacting with the user via a cognitive component such that the user explains the feedback information, including a reasoning for the anomaly, to the cognitive component using natural language dialog; and
predict one or more potential risks associated with a subsequent journey using the one or more risk models; wherein the one or more potential risks are automatically presented to the user via one of the one or more computers associated with the executable instructions.

9. The system of claim 8, wherein the executable instructions further monitor the journey, the user, one or more alternative users associated with the journey, or combination thereof to collect the contextual data, wherein the contextual data includes traffic data, weather data, road conditions, behavior of the user, a health state of the operator, biometric data of the user, sensor data, learned behavioral data of the user in relation to the journey, learned behavioral data of the one or more alternative users, risks shared from the one or more alternative users, or a combination thereof.

10. The system of claim 8,
wherein the detecting of the anomaly includes:
comparing current behavior of the user with previously observed behavior of the user on the journey to detect the anomaly;

comparing current behavior of the user with behavior of one or more alternative users on the journey to detect the anomaly; or comparing the current behavior of the user with defined, standardized behavior.

11. The system of claim 8, wherein the executable instructions further match the anomaly with one or more causes of the anomaly from a list of previously received information relevant to the journey.

12. The system of claim 8, wherein the executable instructions further:

learn the one or more risks or the one or more risk models from the user, a plurality of collaborative users on the journey, a machine learning operation, or a combination thereof;

initialize the machine learning mechanism to learn behavior of the user on the journey and one or more risk models, wherein the plurality of data sources includes at least sensor based devices associated with the user or vehicle, wearable sensors, camera devices, data sources relating to Internet of Things (IoT) computing networks, governmental entities, commercial entities, or combination thereof;

monitor the contextual data and each event associated with the journey; or detect the one or more risks associated with the journey, the one or more potential risks associated with the subsequent journey, or combination thereof according to the contextual data, one or more identified events, one or more risk models, or combination thereof.

13. A computer program product for, by a processor, learning and predicting personalized risk associated with a journey for a user, the computer program product comprising a non-transitory computer-readable storage medium having computer-readable program code portions stored therein, the computer-readable program code portions comprising:

an executable portion that analyzes contextual data gathered from a plurality of data sources relating to a journey of a user;

an executable portion that learns one or more risks associated with the journey according to the contextual data;

an executable portion that generates one or more risk models associated with the one or more risks; wherein generating the one or more risk models includes detecting an anomaly including a deviation between an expected route and an actual route taken by the user, and collecting feedback information from the user regarding the anomaly for determining the one or more risks and a cause of the one or more risks, the feedback information collected by cognitively interacting with the user via a cognitive component such that the user explains the feedback information, including a reasoning for the anomaly, to the cognitive component using natural language dialog; and an executable portion that predicts one or more potential risks associated with a subsequent journey using the one or more risk models; wherein the one or more potential risks are automatically presented to the user via a computing device associated with the processor.

14. The computer program product of claim 13, further including an executable portion that monitors the journey, the user, one or more alternative users associated with the journey, or combination thereof to collect the contextual data, wherein the contextual data includes traffic data, weather data, road conditions, behavior of the user, a health state of the operator, biometric data of the user, sensor data, learned behavioral data of the user in relation to the journey, learned behavioral data of the one or more alternative users, risks shared from the one or more alternative users, or a combination thereof.

15. The computer program product of claim 13, wherein the detecting of the anomaly includes:

comparing current behavior of the user with previously observed behavior of the user on the journey to detect the anomaly;

comparing current behavior of the user with behavior of one or more alternative users on the journey to detect the anomaly; or comparing the current behavior of the user with defined, standardized behavior.

16. The computer program product of claim 13, further including an executable portion that matches the anomaly with one or more causes of the anomaly from a list of previously received information relevant to the journey.

17. The computer program product of claim 13, further including an executable portion that:

learns the one or more risk models from the user, a plurality of collaborative users on the journey, a machine learning operation, or a combination thereof; or initializes a machine learning mechanism to learn behavior of the user on the journey and one or more risk models, wherein the plurality of data sources includes at least sensor based devices associated with the user or vehicle, wearable sensors, camera devices, data sources relating to Internet of Things (IoT) computing networks, governmental entities, commercial entities, or combination thereof;

monitors the contextual data and each event associated with the journey; or detects the one or more risks associated with the journey, the one or more potential risks associated with the subsequent journey, or combination thereof according to the contextual data, one or more identified events, one or more risk models, or combination thereof.

* * * * *